Feb. 18, 1930.　　　F. P. MILLER　　　1,747,455
ROTARY CUTTER
Filed July 30, 1926
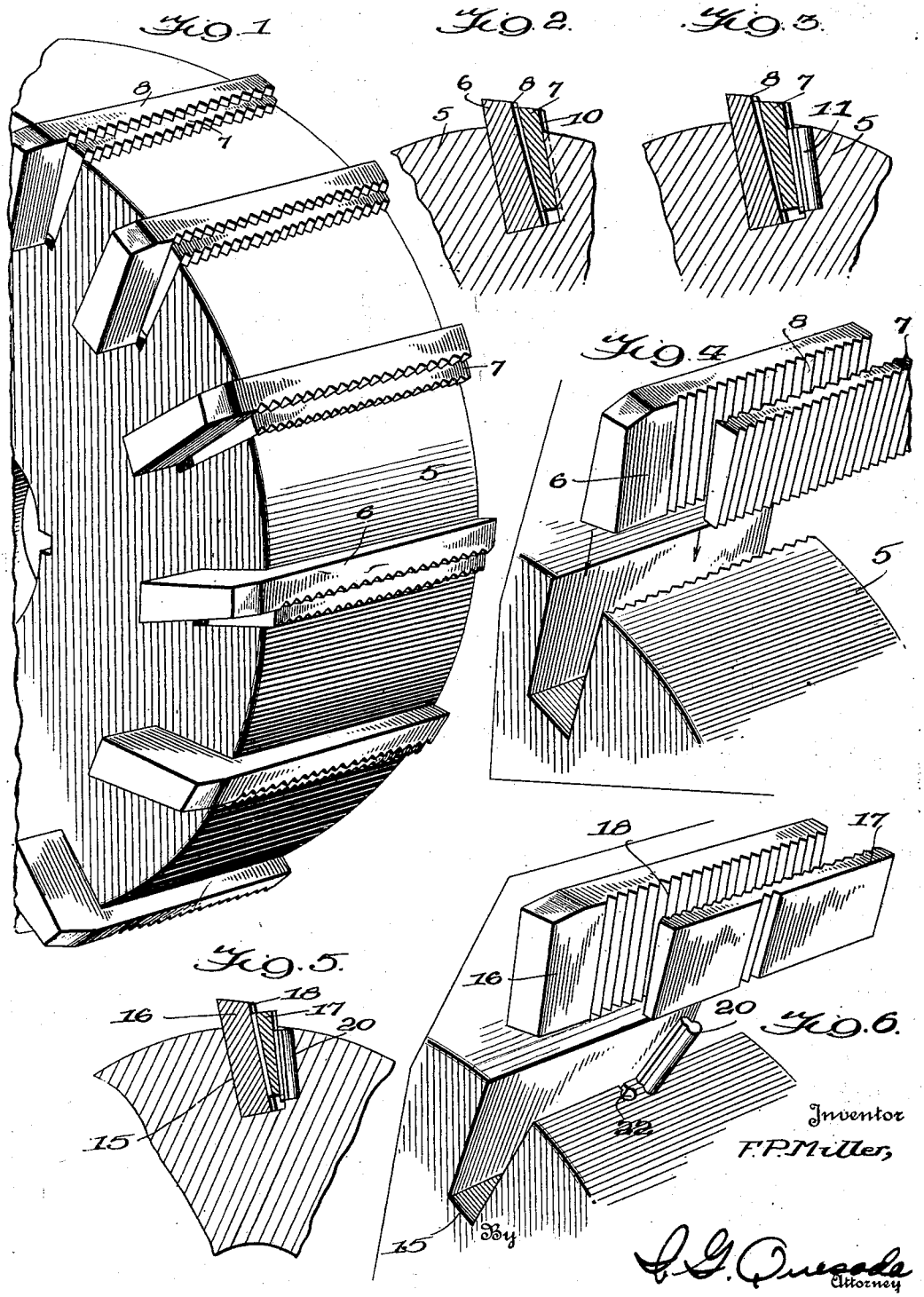
Inventor
F. P. Miller, Patented Feb. 18, 1930

1,747,455

UNITED STATES PATENT OFFICE

FRANK P. MILLER, OF MEADVILLE, PENNSYLVANIA

ROTARY CUTTER

Application filed July 30, 1926. Serial No. 125,953.

This invention relates to rotary cutters such as milling cutters, reamers, counter bores and boring bars.

Briefly stated an important object of the invention is to provide a rotary cutter in which the blades are securely held against axial and longitudinal shifting by means which are highly accessible for adjustment.

Other objects and advantages will be apparent during the course of the following description.

In the accompanying drawing forming a part of this application and in which like numerals are employed to designate like parts throughout the same, Figure 1 is a fragmentary perspective of a rotary cutter embodying the invention.

Figure 2 is a detail sectional view through the same.

Figure 3 is a similar view illustrating a modification of the invention.

Figure 4 is a group perspective of the rotary cutter shown in Figure 2.

Figure 5 is a detail sectional view illustrating another modification of the invention.

Figure 6 is a group perspective illustrating more fully the parts shown in Figure 5.

In the drawing the numeral 5 designates the body of a milling cutter or the like, which body has longitudinal grooves or slots for the reception of blades 6. Figures 2 and 4 illustrate that a wedge 7 is adapted to be driven between one side of each cutter and one side wall of the slot and that the opposed sides of the blade and the wedge have interfitting transverse or substantially radial serrations 8 by which endwise movement of the blade is positively prevented.

In carrying out the invention one side of each wedge and one side wall of the slot may also be provided with transverse or substantially radial serrations 10 which hold the wedge against endwise shifting in the slot. Figure 2 illustrates that the slots may be of uniform width throughout and that the blade may be decreased in width toward the outer edge thereof while the wedge tapers towards its inner edge to provide a binding and wedging engagement between the parts 6 and 7 and the side walls of the slots.

Figure 3 illustrates that a key 11 may be employed in lieu of the interfitting serrations to secure the wedge against endwise movement and that the key is provided with a lateral rib adapted to be received in a transverse groove in the wedge.

In the form of invention illustrated in Figure 5 and 6 the slot 15 may be either tapered or the side walls thereof may be parallel. The blade 16 in this case and the wedge 17 are provided with interfitting transverse or substantially radial serrations 18 by which endwise movement of the blade with respect to the wedge is effectively prevented. In this form of the invention the wedge 17 may be decreased in width toward the inner edge thereof and has its outer surface grooved transversely for the reception of the rib on one side of a locking key 20.

Figure 6 clearly illustrates that the body of the key 20 is received in a groove 22 in one side wall of the slot 15 and that the rib at one side of the same extends into the slot 15 and the adjacent groove in the wedge member whereby shifting of the wedge with respect to the key is prevented. Particular attention is directed to the fact that the groove 22 is keyhole shaped in cross-section and that the restricted part of the groove receives the rib of the key to hold the rib in locking engagement with the wedge. In this form of invention the blade may be of a uniform width or it may be tapered and the slot may be tapered or the side walls thereof may be parallel.

Having thus described the invention what is claimed is:

1. A rotary cutter comprising a body having slots, blades and wedge members in said slots and having the opposed sides thereof provided with interfitting serrations, one side wall of each slot being grooved, and keys received in said grooves and having means for engaging said wedge members to hold the same against endwise shifting, the grooves in said side walls having restricted portions engaging said means whereby to hold the keys against turning.

2. A rotary cutter comprising a body having a slot, the side walls of which converge toward the bottom of the slot, a blade having an attaching portion of substantially uniform width received in said slot, a wedge member between said blade and one of said side walls and having grooves, one of said converging side walls being provided with a groove having a restricted portion, and a key received in said groove and having a laterally projecting rib snugly extending through said restricted portion and received in one of said grooves to hold the wedge member against endwise shifting.

In testimony whereof I affix my signature.

FRANK P. MILLER.